United States Patent [19]

Jouppi

[11] Patent Number: 5,150,469
[45] Date of Patent: Sep. 22, 1992

[54] SYSTEM AND METHOD FOR PROCESSOR PIPELINE CONTROL BY SELECTIVE SIGNAL DEASSERTION

[75] Inventor: Norman P. Jouppi, Palo Alto, Calif.

[73] Assignee: Digital Equipment Corporation, Maynard, Mass.

[21] Appl. No.: 554,131

[22] Filed: Jul. 13, 1990

Related U.S. Application Data

[63] Continuation of Ser. No. 283,499, Dec. 12, 1988, abandoned.

[51] Int. Cl.[5] .......................... G06F 9/38; G06F 9/30
[52] U.S. Cl. .................................. 395/375; 364/231.8;
  364/228.6; 364/241.6; 364/263.2; 364/931.49;
  364/933.2; 364/948.34; 364/941.7; 364/DIG. 1
[58] Field of Search ........................................ 395/375

[56] References Cited

U.S. PATENT DOCUMENTS

| | | | |
|---|---|---|---|
| 3,875,391 | 4/1975 | Shapiro | 364/200 |
| 4,025,771 | 5/1977 | Lynch, Jr. et al. | 364/200 |
| 4,112,489 | 9/1978 | Wood | 364/200 |
| 4,149,242 | 4/1979 | Pirz | 364/200 |
| 4,228,497 | 10/1980 | Gupta | 364/200 |
| 4,253,183 | 2/1981 | Taylor | 364/200 |
| 4,305,124 | 12/1981 | Marro | 364/200 |
| 4,365,311 | 12/1982 | Fukunaga | 364/900 |
| 4,414,669 | 11/1983 | Heckelmann | 364/200 |
| 4,438,492 | 3/1984 | Harmon | 364/900 |
| 4,463,441 | 7/1984 | Kassabov et al | 364/900 |
| 4,498,136 | 2/1985 | Sproul | 364/200 |
| 4,524,455 | 6/1985 | Holsztynski et al. | 364/200 |
| 4,573,118 | 2/1986 | Damouny et al. | 364/200 |
| 4,589,067 | 5/1986 | Porter | 364/748 |
| 4,646,236 | 2/1987 | Crockett | 364/200 |
| 4,658,355 | 4/1987 | Hatakeyama | 364/900 |
| 4,750,112 | 6/1988 | Jones | 364/200 |
| 4,794,524 | 12/1988 | Carberry | 364/200 |
| 4,802,113 | 1/1989 | Onishi | 364/900 |
| 4,903,264 | 2/1990 | Talgam et al. | 371/16.1 |

*Primary Examiner*—David Y. Eng
*Assistant Examiner*—Ken S. Kim
*Attorney, Agent, or Firm*—Flehr, Hohbach, Test, Albritton & Herbert

[57] ABSTRACT

A processor pipeline control system and method provides a complete set of very simple and very fast pipeline control signals encompassing stalls and interrupts. Each pipeline stage has associated with it a signal called "LoadX", where X is the pipeline stage name, e.g., LoadID. Instead of signalling exceptional conditions in terms of the event, e.g., "cache miss", exceptional conditions are signalled within the processor by deasserting the LoadX signals required by that exception. When the pipeline control for one pipestage is deasserted, in order to prevent previous instructions from entering the stalled pipestage, the detector of the exceptional condition must deassert all LoadX control signals for stages previous to X as well.

18 Claims, 3 Drawing Sheets

SYSTEM AND METHOD FOR PROCESSOR PIPELINE CONTROL BY SELECTIVE SIGNAL DEASSERTION

This is a continuation of application Ser. No. 07/283,499 filed Dec. 12, 1988 now abandoned.

BACKGROUND OF THE INVENTION

1. Field of the Invention

The present invention relates generally to a system and method for controlling the operation and advancement of computer pipeline stages. More particularly, it relates to such a system and method which does so in a complete, practical and simple manner.

2. Description of the Prior Art

Modern high-performance data processing systems are pipelined machines. In pipelining, the operations required to process each computer instruction are partitioned into a number of stages. Each of these "pipeline stages" performs a specific function for the execution of a machine.

Pipelining techniques were originally developed in the early 1960's. Some machines have very complicated pipelines with many stages, and the ability to have instructions skip stages, buffer instructions between stages, or even reorder instruction execution as processing progresses. In a conventional pipeline control mechanism, a control input is provided for each possible exceptional event. On the occurrence of one or more exceptional events that require a stall or interrupt during a machine cycle, it is necessary to translate and rank order these control inputs according to priority. Such translating and prioritizing can result in significant delays that increase cycle time and therefore reduce data processing throughput.

More specifically, a major complexity of conventional pipeline control methods arises from the handling of stalls and interrupts. Stalls can cause either some or all of the pipeline stages to stop, depending on the cause of the stall. Stalls are typically communicated within the CPU by a number of signals denoting exceptional conditions, such as cache miss, instruction buffer miss, page fault, interlock type x, and the like. These exceptional conditions then must be prioritized and translated into control signals for each pipeline stage.

Interrupts abort the execution of some pipestages and allow the remainder to continue execution, start executing new instructions at a system location, and change privilege operation modes. One difficulty with interrupts is choosing the instruction address ("PC") of the instruction at which to resume execution while taking the interrupt. This becomes even more complicated in the presence of multiple interrupts in the same cycle. If different interrupts have different "trap vectors", i.e., branch addresses, the interrupts must be prioritized before the proper PC can be saved for resuming execution and the execution begun at the new address.

Thus, a number of features present in the prior art require complex and slow pipeline control logic:

1. The need to prioritize exceptional stall conditions and translate these signals to control signals for each pipestage.

2. The need to prioritize interrupt conditions in order to save the PC corresponding to the highest priority interrupt, abort instructions following the cause of the interrupt, and choose a trap vector address. Since the hardware to implement this capability might be used on any cycle, it is evaluated on every cycle, and can easily set a lower bound on machine cycle time. This is further exacerbated by the fact that many of the exceptional conditions or interrupts come from distant portions of the machine and may spend a considerable amount of the cycle just traveling to a central prioritized.

SUMMARY OF THE INVENTION

This invention is primarily intended for simple pipelines. For purposes of this description, it is assumed that instructions pass through each stage of the pipelines in order. A very simple pipeline is as follows:

IF—instruction fetch
ID—instruction decode, fetch registers used
ALU—perform ALU operation for instruction or memory address
MEM—fetch operand from memory
WB—write result of instruction back into register file This invention provides a complete set of very simple and very fast pipeline control signals encompassing stalls and interrupts. Each pipeline stage has associated with it a signal called "LoadX", where X is the pipeline stage name, e.g., LoadID. Instead of signalling exceptional conditions in terms of the event, e.g., "cache miss", exceptional conditions are signalled within the processor by deasserting the LoadX signals required by that exception. When the pipeline control for one pipestage is deasserted, in order to prevent previous instructions from entering the stalled pipestage, the detector of the exceptional condition must deassert all LoadX control signals for stages previous to X as well. For example, in the simple pipeline above, if an exceptional condition requires LoadALU to be deasserted, the detector of that condition must deassert LoadID and hence LoadIF as well. When multiple exceptional conditions occur in the same cycle, there is no need to prioritize these conditions, since the previously described method can handle multiple exception detectors deasserting groups of signals in parallel. For example, if an interlock requiring deassertion of LoadID and LoadIF occurs concurrently with a cache miss requiring deassertion of all pipeline control signals, both can deassert their appropriate control signals at the same time. Since all deassertions of the LoadX signals are wired-ORed, the net effect will be the same as the exceptional condition that deasserts the most signals. In this example the cache miss deasserts all the LoadX signals, and the effect of the interlock is not visible, which is the same result as if the exceptional conditions were prioritized.

When interrupts occur, all instructions that have not committed are aborted. A PC queue, containing the address of every instruction in the pipeline, stops shifting. Each of these queue entries is named according to its pipestage, e.g., IFpc, IDpc, ALUpc. Instead of saving one PC (or two in the case of a machine with a delayed branch of delay 1), all the PC's are kept in the queue, and the machine begins execution at a common interrupt vector location. It is then up to software to interrogate program status words (PSW's) throughout the machine to find all the causes of interrupt, to prioritize them and to branch to code to handle appropriately the trap selected. There can be more than one interrupt in a cycle, just as there can be more than one type of stall in a cycle. Each different trap handler may choose different instructions from the PC queue to restart. This mechanism for handling interrupts eliminates the need to prioritize interrupts in order to select a trap vector and to save the appropriate PC to restart in the cycle the interrupt is handled.

The attainment of the foregoing and related advantages and features of the invention should be more readily apparent to those skilled in the art, after review of the following more detailed description of the invention, taken together with the drawings, in which:

DESCRIPTION OF THE PREFERRED EMBODIMENTS

Figure 1:
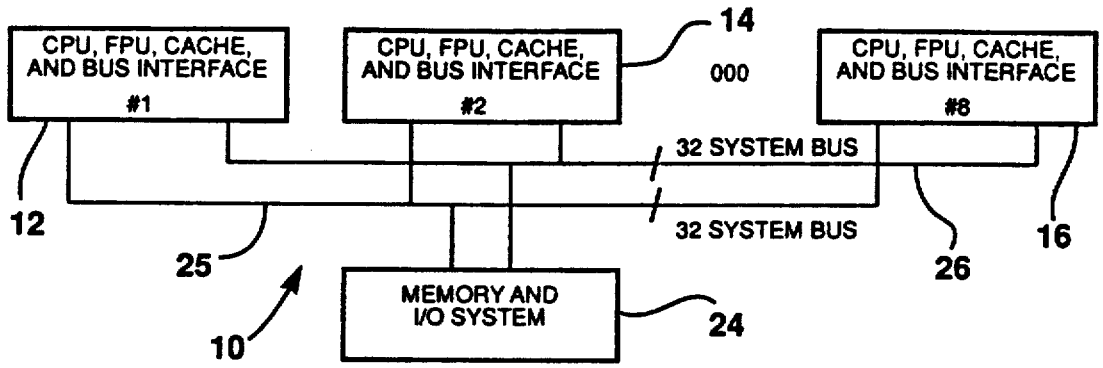
FIG. 1 is a block diagram of a multiprocessor system in which the invention is implemented.
Figure 2:
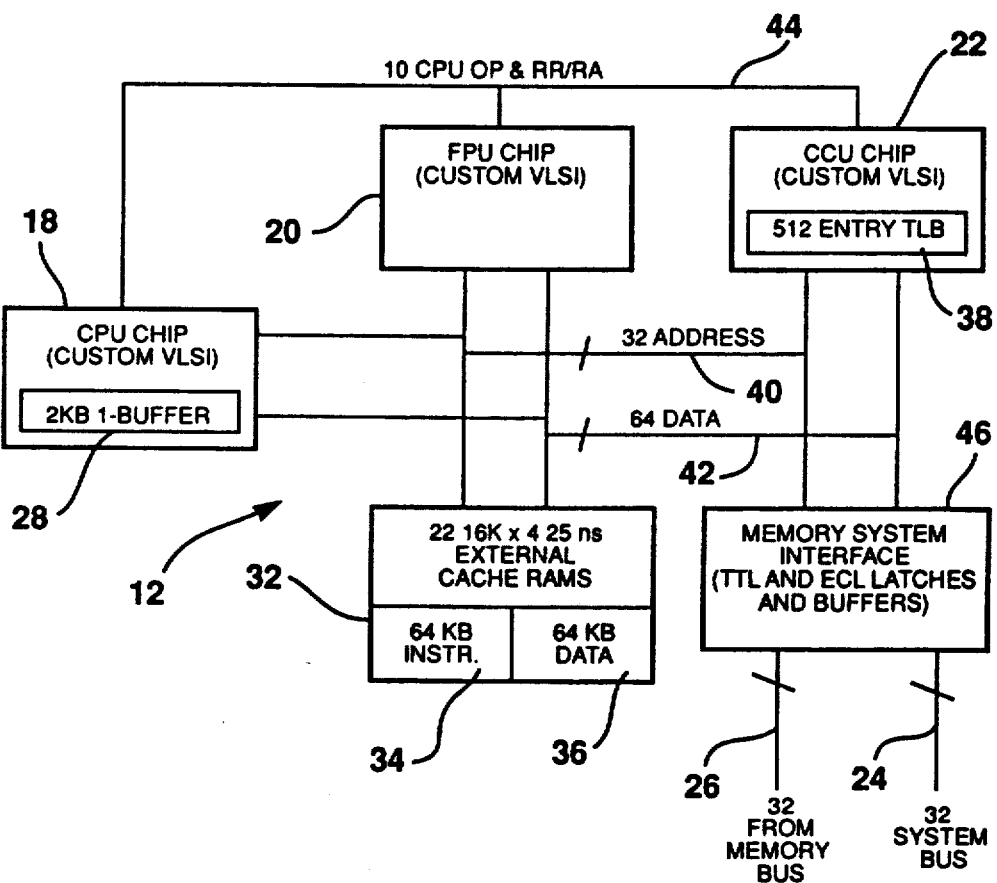
FIG. 2 is a more detailed block diagram of one processor in the system of FIG. 1.

Turning now to the drawings, more particularly to FIGS. 1 and 2, there is shown a multiprocessor system 10 in which the system and method for processor pipeline control of this invention is used. Each processor 12, 14 and 16 consists of three custom CMOS integrated circuit chips: a central processing unit (CPU) 18, a floating point coprocessor (FPU) 20, and an external cache controller (CCU) 22. A typical configuration of the system 10 has eight processors, but only the three processors 12, 14 and 16 are shown. The processors 12, 14 and 16 are connected to a memory and input/output (I/O) system 24 by a 32-bit system bus 25 and a 32-bit memory bus 26. The system 10 is a very simple reduced instruction set computer (RISC) with a branch delay of one, hardware support for small-grain parallel processing, and vector floating point registers and operations. The system 10 uses a pipeline and method for handling exceptions which is described further below.

Further details of the processor 12 are shown in FIG. 2. The other processors 14 and 16 in the system 10 have the same construction. The processor 12 has a large instruction buffer 28 on custom VLSI CPU chip 18 as well as a large external cache 32 with an instruction portion 34 and a data portion 36. The CPU instruction buffer 28 cache containing 512 words, and is direct-mapped with a line size of 4 words. The instruction buffer 28 is addressed with virtual addresses. The 128K byte external cache 32 is partitioned into 64K bytes of data at 36 and 64K bytes of instructions at 34, also with a line size of 4 words The external cache 32 is implemented with commercially available 16Kx4 20ns static RAMs and is a physically addressed cache.

The custom VLSI CCU chip 22 handles virtual to physical address translation, interface to I/O devices at 24, low overhead processor to processor communication, interactions with the memory system 24, and control of the cache 32 during CPU memory references. The CCU 22 has a translation buffer (TLB) 38, and TLB 38 access is in parallel with the cache 32 access. In order for this to occur, without sharing of unmapped and mapped bits resulting in restrictions on page placement in main memory, the page size must be greater than or equal to the cache size. The smallest page size given these constraints has been chosen, resulting in a page size of 64K bytes.

The external cache 32 is write-back, as opposed to write-through. The instruction buffer 28 and instruction partition 34 of the external cache 32 do not monitor D-stream references, so writing into the instruction stream will have unpredictable effects unless the caches are flushed appropriately. The entire on-chip instruction buffer 28 is cleared by all context switches. The external cache 32 may be cleared on a line by line basis with a cache flush instruction.

The CCU 22 provides support for software control of shared data, as opposed to hardware control of shared data, such as a snoopy bus. In direct mapped caches, where data store and tag store are implemented with the same speed RAMs, provisional data is available a significant amount of time before hit or miss is known. The CPU 18 takes advantage of this property; it starts using the data a cycle before hit or miss is required from the CCU 22. Similarly, page faults are not known until after the data may have been written back into the register file. Thus, when a memory reference page faults, the instruction is allowed to complete in error before an interrupt occurs. Kernel software resumes execution with the instruction that caused the page fault. Note that this requires all memory references to be idempotent. The details of virtual address translation are orthogonal to the CPU chip 18 itself.

The custom VLSI floating point coprocessor (FPU) 20 performs G-format double precision (64 bit) floating point addition, subtraction, multiplication, reciprocal approximation, conversion to and from integer, and single precision (32 bit) integer multiplication. These operations take place concurrently with normal instruction processing of the CPU 18, except that the CPU 18 and CCU 22 wait for completion of operations when they need a result from the coprocessor. The FPU 20 has 52 general purpose registers, and supports vector arithmetic operations. The CPU chip 18 is the only chip to generate memory addresses. In coprocessor loads and stores, the CPU chip 18 generates addresses as if it were a load or store of its own register file, but ships the register address to the coprocessor. The coprocessor then either latches or sends out the data.

The CPU 18, FPU 20, CCU 22 and external cache 32 are interconnected by a 32-bit address bus 40, a 64-bit data bus 42 and a 10-bit CPU Operation and RR/RA bus 44. Memory system access is through a memory system interface 46 containing TTL and ECL latches and buffers and connected between the buses 24 and 26 and the buses 40 and 42.

CENTRAL PROCESSING UNIT

Figure 3:
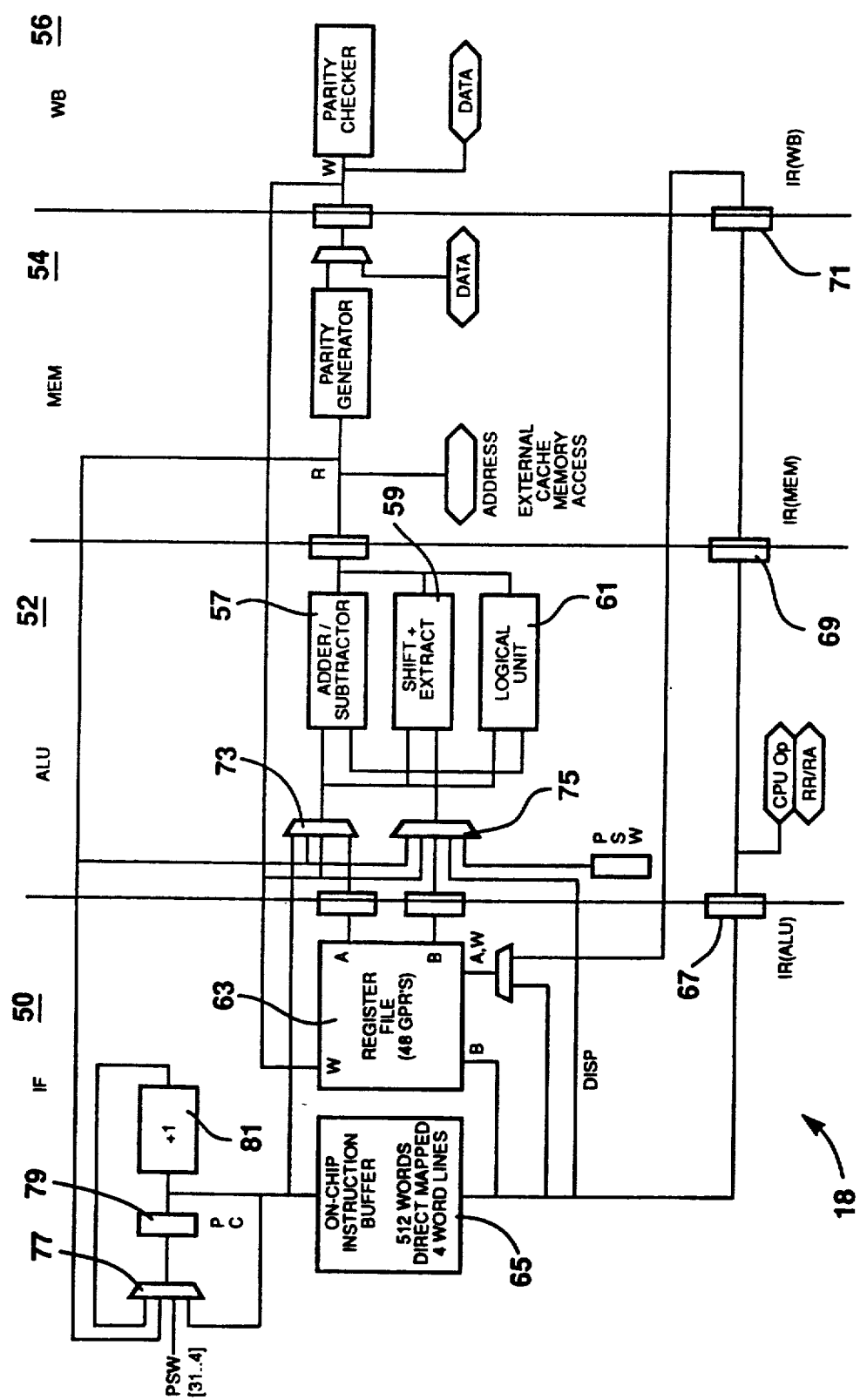
FIG. 3 is a block diagram of a portion of the processor of FIG. 2, showing a first embodiment of a system in accordance with the invention.

Pipeline and organization of the CPU 18 are shown in FIG. 3. The organization chosen is efficient in its use of datapath resources. For example, only one ALU is required; it is shared between address computations and arithmetic operations and is used at the same time for both. This and other efficiencies allow the datapath to be small, even though the CPU 18 has more registers than most machines.

INSTRUCTION SET ARCHITECTURE

Certain overriding concerns determined the encoding of the instruction set for the CPU 18. First, in order for instruction source registers to be fetched in parallel with decoding of the opcode, the register sources must be in one and only one position in all instructions. Since store instructions read their operand to be stored at the same time as loads write their target, and arithmetic operations write their destination at the same time as loads, both store sources, load destinations, and arithmetic destinations must be in the same place. Some instructions, like add immediate, have only one register source and destination, so this constrains one source and the destination register to be specified by the high order halfword, since the displacement is in the low order halfword. There is enough encoding space for 64 registers (although only 48 general purpose registers are implemented). With a four bit opcode, we will neatly use the upper halfword: the opcode resides in the highest four bits, followed by the destination (rr) and the first source (ra).

Second, the opcode should be trivial to decode. Thus, the instruction opcodes are arranged so that one or two bits determine most functions. For example, all instructions with 16 bit displacements have as their highest bit "1". As another example, all the instructions with a valid destination register can be covered with two Boolean n-cubes. The encodings are given in Table I.

TABLE I

| Opcode | Instruction |
|---|---|
| 0 | trap |
| 1 | extract |
| 2 | undefined operation |
| 3 | variable extracts |
| 4 | CPU to coprocessor transfer |
| 5 | coprocessor to CPU transfer |
| 6 | coprocessor ALU (+, −, *, /, convert to or from FP) |
| 7 | CPU ALU |
| 8 | undefined operation (reserved for CPU store byte) |
| 9 | test operation |
| 10 | coprocessor store |
| 11 | coprocessor load |
| 12 | CPU store |
| 13 | CPU load |
| 14 | conditional jump |
| 15 | add immediate |

CPU registers are named r0 through r63. The expression "rx" refers to the contents of the register whose number is encoded in the rx field of the current instruction, where rx is one of ra, rb or rr. There are two instruction formats, shown in Table II.

TABLE II

| <4> opcode | <6> rr | <6> ra | <6> rb | <10> miscellaneous |
|---|---|---|---|---|
| <4> opcode | <6> rr | <6> ra | | <16> displacement |

CPU registers 48 through 63 are special registers. They cannot be read and written in all circumstances as can general purpose registers. For example, the program counter (special register 63) can only be read as the first source and not as the second. The circumstances in which specials may be used are discussed below. To avoid confusion, the special registers are referred to by their name and not by their number in this application. They can only be accessed by CPU instructions, and not by CCU or FPU instructions. The special CPU registers are listed below in Table III. Using special registers as sources for instructions in circumstances other than those in the listed restrictions will return undefined data but will not cause any exception or errors in that or other instructions. Moreover, using the PSW as a destination, since it is write-only, will also have no effect. Thus, the recommended No-op is "PSW := PSW op PSW", where op is any ALU or shift operation.

TABLE III

| Number | Name | Restrictions |
|---|---|---|
| 63 | PC | Only for rr in ALU or add imm, ra in all instructions |
| 62 | PSW | Only for rb in ALU or var byte (it is read only) |
| 61 | PCQE | Only for rb in ALU or var byte, rr in ALU or add imm |
| 60 | PCQ | Only for rb in ALU or var byte, rr in ALU or add imm |
| 59–48 | reserved for future use | |

PCQ is a queue of four addresses: IFpc, ALUpc, MEMpc and WBpc. When the processor is not in kernel mode, successive values of the pc enter the queue. When a trap occurs, WBpc contains the pc of the instruction which was in its WB pipestage, MEMpc the next instruction, ALUpc the third, and IFpc the address of the instruction in its IF pipestage.

PIPELINE TIMING

The CPU 18 has a four stage pipeline. The stages are instruction fetch (IF) 50, compute (ALU) 52, memory access (MEM) 54 and result write back (WB) 56. The CPU 18 has four major data path blocks: adder/subtractor 57, shifter/extractor 59, logical unit 61 (capable of executing 16 Boolean functions) and register file 63. The register file 63 has three ports: two are read for A and B ALU source operands and the ALU results are written to the W port. There are three instruction registers (IR) 67–71. IR[ALU] 67, IR[MEM] 69 and IR[WB] 71 hold instructions supplied by the instruction buffer 65 in the ALU, MEM and WB pipestages, respectively. The IR 67–71 consist of an opcode and one register specifier. Source operand and bypass multiplexers 73 and 75 are connected between the register file 63 and the adder/subtractor 57, the shifter/extracter 59 and the logical unit 61. PC selection multiplexer 77 is connected to supply results of the ALU operations and instruction addresses that have been incremented by incrementer 81 to an instruction address register (PC) 79. A description of the actions taken in each pipestage 50–56 is given in Table IV below. Each pipestage is broken into four clock phases p1–p4. One and only one of the clock phases is high at all times, subject to small amounts of skew, which may result in zero or two clock phases being high for a few nanoseconds.

TABLE IV

| Pipestage | | Function |
|---|---|---|
| IF 50 | p1 | PC → IBuf decoders |
| | p2 | IBuf decoders → sense amp outputs |
| | p3 | sense amp outputs → register file decoders |
| | p4 | register file decoders → sense amp outputs |
| ALU 52 | p1 | operand sources → functional units |
| | p2 | compute |
| | p3 | compute |
| | p4 | functional units → result bus |
| MEM 54 | p1 | if load or store, memory address computed above → memory, otherwise idle |
| | p2 | cache access |
| | p3 | cache access |
| | p4 | cache access |
| WB 56 | p1 | memory data → functional units if load |
| | p2 | write register file if load, read if store |
| | p3 | memory data → memory if store |

TABLE IV-continued p4

In the absence of exceptional conditions, one instruction is issued every cycle (40 nsec). All instructions commit in their WB pipestage 56; this implies if an instruction causes an interrupt it can only do so in WB 56.

In the following discussion, store class instruction will be used generically to refer to CPU store, coprocessor store and CPU to coprocessor transfer, which all use the data and/or address busses 42 and 40 (FIG. 2) in the WB stage 56. Load class instruction will be used to refer to CPU load, coprocessor load, coprocessor to CPU transfer, and coprocessor ALU instructions, which all use the data and/or address busses 42 and 40 in the MEM pipestage 54. The following exceptional conditions are handled by the machine:

| | |
|---|---|
| Load Interlock | If a CPU register is written by a load instruction, and used as the source in the next instruction, one additional cycle is lost. |
| Store Interlock | If the instruction following a store class instruction is a load class or store class instruction, one cycle is lost. |
| Coprocessor → CPU Transfer Interlock | If a Coprocessor → CPU transfer instruction follows a coprocessor load or store, one additional cycle is lost. |
| CPU → Coprocessor Transfer Interlock | If a Coprocessor → CPU transfer instruction attempts to issue two cycles after a CPU → Coprocessor transfer, one additional cycle is lost. Note that if a CPU → Coprocessor transfer is followed immediately by a Coprocessor → CPU transfer, a store interlock will occur on the first attempted issue of the Coprocessor → CPU transfer, and then the CPU → Coprocessor transfer interlock will occur, increasing the spacing between the two transfers to three. |
| Instruction Buffer Miss | Any instruction fetch which misses in the instruction buffer will incur at least a two cycle delay, assuming a hit in the external instruction cache. An instruction buffer miss that occurs while a store is in its MEM stage 54 will be delayed one additional cycle. If the missing instruction is on word 3 of the line, or if there is a taken branch in the ALU pipestage 50, one additional delay cycle will occur at the end of an instruction buffer miss. |
| External Cache Miss | A load, store, or instruction buffer miss which misses in the external cache results in a delay of 14 cycles. If a load or store instruction immediately follows a load or store instruction that misses, one extra delay cycle will occur. |
| Coprocessor Stall | Wait for completion of the coprocessor can cost up to 48 cycles. |
| Trap or Interrupt | Any trap condition costs a three cycle delay until the instruction at the location specified by the upper 28 bits of PSW is executed. This will be followed by a further delay because the I-buffer will miss (since it is cleared on all context |

Although page faults, coprocessor traps and bus errors are all signalled via the same interrupt pin, these conditions are differentiated by program status words (PSW's) in each of the CPU 18, CCU 22 and FPU 20. Table V gives the format of the CPU PSW. It is read only and reading it is not privileged.

PROGRAM STATUS WORDS

TABLE V

| <23> | 1 | <3> | 1 | 1 | 1 | 1 | 1 |
|---|---|---|---|---|---|---|---|
| zero | S | PrId | B | T | V | K | P |

The B bit is on if the processor is being is generated internally from the CPU by delaying the Reset input. The PrId field is the hardware processor identification. It is directly connected to three external pins and can range from 0 to 7. During boot sequences the upper 28 bits of the PSW (the other bits are zero) is used as a base address; the PrId field allows different processors to execute different code. The PrId field is placed in the PSW so that different processors will execute different cache lines. The S bit is on if the processor is being booted and is requested to save its state before booting. The S bit is a chip input, and is driven from the clock/scan board.

The T bit is '1' if a software trap occurred when the last interrupt was taken. The V bit is '1' if an instruction having an arithmetic overflow trap was in its WB pipestage 56 when the last interrupt was taken. The K bit is '1' if the instruction in the IF pipestage is in kernel mode. In kernel mode all interrupts are disabled and privileged instructions are enabled. The P bit is '1' if a hard parity error occurred in the cycle before the interrupt.

Note that since interrupts are not encoded or prioritized, other interrupts could have occurred at the same time, such as TLB fault, FP divide by zero, and the like. In order to determine whether other exceptions occurred, the FPU 20 and CCU 22 PSWs must be examined.

PIPELINE ADVANCEMENT

There are seven possible ways in which the pipeline advances from one cycle to the next. Table VI lists them in increasing order of priority. There are also eight control lines which determine pipeline advancement either directly or indirectly: LoadIF (internal to CPU 18), LoadALU, LoadMEM, Load WB, AllowInterrupt, Interrupt, Reset and Kernel.

TABLE VI (1) Normal pipeline advance:
  WB := MEM;
  MEM := ALU;
  ALU := IF;
  IF := PC + 4;
(2) Branch taken pipeline advance:
  WB := MEM;
  MEM := ALU;
  ALU := IF;
  IF := Branch target;
(3) Interlock (LoadIF deasserted; LoadALU, LoadMEM and LoadWB are not)
  WB := MEM;
  MEM := ALU;
  ALU := NIL; delay slot injected here

TABLE VI-continued

IF := Recirculate;
(4) IBuf miss (LoadALU deasserted; LoadMEM and LoadWB are not)
  WB := MEM;
  MEM := IBM refill; a load class instr
  ALU := Recirculate; ALU does not advance
  IF := Recirculate;
(5) Memory Reference Retire (LoadMEM deasserted, LoadWB is not)
  WB := NIL;
  MEM := Recirculate;
  ALU := Recirculate;
  IF := Recirculate;
(6) LoadWB deasserted (i.e., "stall")
  WB := Recirculate;
  MEM := Recirculate;
  ALU := Recirculate;
  IF := Recirculate;
(7) Interrupt (Interrupt and AllowInt asserted, or Reset asserted)
  WB := NIL;
  MEM := NIL;
  ALU := NIL;
  IF := PC = PSW[31 ... 4];
(8) Uninterruptible Stall (LoadWB and AllowInt deasserted)
  WB := Recirculate;
  MEM := Recirculate;
  ALU := Recirculate;
  IF := Recirculate;

LoadWB, LoadMEM, LoadALU and LoadIF control whether each of the four pipestages 50-56 stalls or advances. If the advance signal for a later pipestage is deasserted, the advance signals for all previous pipestages must be deasserted as well. This is required so that instructions do not overtake (i.e., crash into each other) in the pipeline. For example, if LoadMEM is deasserted, LoadALU and LoadIF must be deasserted as well. Since the LoadIF signal only exists inside the CPU, it deasserts LoadIF internally when it sees LoadALU deasserted.

If all signals have the load signal asserted, there is no interrupt, and the instruction in ALU is not a taken branch, all pipestages 50-56 advance and the new IFpc is IFpc+4 (case 1). If an unconditional branch or a taken conditional branch is exiting its ALU pipestage, all signals have their load signal asserted, and there is no interrupt, then the branch target is specified by the branch in ALU is the next IFpc (case 2). An interesting variation on this appears in the case of interlocks (case 3). In an interlock, LoadIF is deasserted, but all the other pipeline advance signals are asserted, and there is no interrupt. If a taken branch instruction is in ALU during an interlock, it must advance since LoadALU and LoadMEM are asserted. However, the branch target cannot be immediately loaded into the IF pipestage 50 since the interlock mandates that the instruction in IF 50 be held. Thus, interlocks are not allowed if a taken branch is in ALU. The only way to generate an interlock in IF concurrent with a taken branch in ALU is with a CPU→Coprocessor transfer followed by a taken branch with a Coprocessor→CPU transfer in the branch delay slot. This code sequence should never be generated or else unpredictable operation may result.

In the IBuf miss sequence (case 4) the ALu pipestage must not advance into MEM and thereby use the address pins. The IBuf miss sequence usually occurs for two cycles, but may require an additional cycle at the start of the sequence if a store class instruction is in Mem when the IBuf misses. During an instruction buffer miss, a total of two load-class pseudo instructions are inserted into the MEM pipestage in successive non-stall cycles. The first loads the requested doubleword into the cache line and the second loads the non-requested doubleword. The additional cycle delay that occurs when the instruction buffer misses with a store in the MEM pipestages is just a special case of the store interlock.

The next instruction must be on the same line as the miss instruction so that the non-requested doubleword of the buffer line can be written into the buffer. An additional cycle is required at the end of the sequence if the next instruction is not on the same cache line. This is determined (slightly pessimistically) in the miss cycle by checking if the miss instruction is at word 3 of a cache line or if a taken branch is in the ALU pipestage. (In reality, the branch could be to the same cache line, and no extra cycle would be required.)

During stalls LoadWB and all earlier Load signals are deasserted (case 6). This results in all pipestages being stalled. If LoadMem is deasserted during an external cache miss but LoadWB is not, this signifies the requested data is on the data bus, and the instruction in WB should be retired (case 5). However, the following instructions may not advance until the memory operation completes.

If Interrupt and AllowInt (allow interrupt) are asserted, an interrupt is taken (case 7). AllowInt (and all the pipeline Load signals) may be deasserted during phase 3 if the CCU is in the process of a memory transaction. Thus AllowInt disables the effects of the Interrupt signal (case 8). To prevent exceptions from being handled, interrupts are ANDed with AllowInt. Inside the CPU the External Reset signal is ORed with the result of the ANDing of AllowInt and Interrupt. Thus, reset has the same effect as an enabled interrupt, except that reset should be asserted at least 7 cycles so that all pipeline state can be reset. Although interrupt receivers must check AllowInt to tell if an interrupt is valid, interrupt sources must check the Kernel signal before generating interrupts. Interrupts should never be asserted in kernel mode, since if it is taken the return addresses will not have been saved in the PCQ.

Table VII gives the operation of each pipestage given the values of LoadMem, Interrupt, LoadWB, IBuf Miss, and Interlock. Int is actually "reset or (AllowInt and Interrupt)" in the table.

INTERRUPTS

Upon any of a set of special circumstances, the processor interrupts the normal sequence of instruction execution, sets the program status word to kernel mode (interrupts disabled, privileged instructions enabled), disables address translation, and forces the upper 28 bits of the PSW as the new PC. In addition it sets bits in the program status word indicating if a trap instruction or arithmetic overflow was one cause of the interrupt (there may be more than one cause). If an interrupt occurs in kernel mode, the processor follows these same steps. However, since in kernel mode the PCQ does not advance, nop record of the trap PC will be saved. Thus, all interrupt generators must check the Kernel bit and only generate interrupts if the kernel bit is off.

The PCQ records the PC associated with each pipestage. The PCQ is read from WBpc and written to IFpc. When the PCQ is read, WBpc is output and the PCQ shifts by one. Similarly, when IFpc is written the PCQ shifts by one to make room for the new entry. Whenever a nop (i.e. "bubble") is inserted into the pipe, the nil instruction has as its PC the PC of the next valid instruction in the pipeline. Nil instructions can be inserted between WB and MEM during cache misses, between MEM and ALU during instruction buffer misses, and between ALU and IF during interlocks (see Table VIII). In fact, in some circumstances there may be as few as two distinct PC's in all four PCQ registers: in other words, only two valid instructions exist in the pipeline. For example, if an instruction buffer miss occurs two successive nil instructions will be inserted in the MEM pipestage. If the instruction buffer miss faults in the TLB, this will be detected when the first pseudo-load instruction for the I-buffer reload is in its WB pipestage. At this point the instruction in IF is the faulting instruction, and the PC's in ALUpc, MEMpc, and WBpc are all the PC of the instruction in its ALU pipestage at the time that the instruction buffer miss occurred.

TABLE VIII

| Code Sequence |
| --- |
| 51: r1 := 0[r2]; |
| 52: r3 := r1 + r7; |
| 53: pc := pc — 43; |
| 54: r4 := 2[r3]; |

| | time → | | | | | |
| --- | --- | --- | --- | --- | --- | --- |
| PCQ Sequence | 1 | 2 | 3 | 4 | 5 | 6 |
| WBpc | — | — | — | 51 | 52 | 52 |
| MEMpc | — | — | 51 | 52 | 52 | 53 |
| ALUpc | — | 51 | 52 | 52 | 53 | 54 |

TABLE VII

| Control | Int | LoadWb | LoadMEM | Load ALU | LoadIF | |
| --- | --- | --- | --- | --- | --- | --- |
| WB | 1 | X | X | X | X | nop |
| | 0 | 1 | 0 | X | X | nop |
| | 0 | 0 | 0 | X | X | WB |
| | 0 | 1 | 1 | X | X | MEM |
| MEM | 1 | X | X | X | X | nop |
| | 0 | X | 1 | 0 | X | nop |
| | 0 | X | 0 | 0 | X | MEM |
| | 0 | X | 1 | 1 | X | ALU |
| ALU | 1 | X | X | X | X | nop |
| | 0 | X | X | 1 | 0 | nop |
| | 0 | X | X | 0 | 0 | ALU |
| | 0 | X | X | 1 | 1 | IF |
| IF | 1 | X | X | X | X | nop |
| | 0 | X | X | X | 0 | IF |
| | 0 | X | X | X | 1 | next PC |

TABLE VIII-continued

| pc in IF | 51 | 52 | 52 | 53 | 54 | 10 |
|---|---|---|---|---|---|---|

The chip set maintains parity on its 64-bit local data bus. This parity is odd byte parity. Checking of parity is controlled by the CheckParity signal, output by the CCU from its PSW. On all CPU load and Cop→CPU transfer instructions the CPU checks the parity of the word written into its register file (see FIG. 3). If the parity is incorrect, and CheckParity is asserted, the CPU asserts interrupt in the following cycle (assuming AllowInt is asserted). Thus, the parity error is associated with the instruction before the instruction recorded in WBpc (unless a stall was in progress with AllowInt asserted at the time of the interrupt). Since the values of LoadWB at the time of the interrupt is not saved, the instruction causing the parity error can not be determined precisely, and is usually not even one of the instructions in the PCQ. But hard parity errors are not restartable in software anyway, so this impreciseness is of little consequence except to diagnostic programs.

The CPU places proper parity on the driven word of the data bus in CPU stores and CPU→Cop transfers. In order to drive the parity bits at the same time as the data bits, the parity bits must be available when the data is read out of the register file (i.e., the parity bits must be stored in the register file too). Data is written into the register file from two sources: the local data bus, or a functional unit within the CPU (e.g., ALU, barrel shifter, and compare unit). The local data bus has parity; to provide proper parity in the case of results of CPU functional unit results written into the register file, parity is computed on the R bus during the ALU, shift or extract instruction's normally idle MEM stage. On each write of the register file the parity of the written word is checked. This checks incoming data in the case of a CPU load-class instruction, and also checks the parity generator in the case of a CPU ALU, shift, or extract instruction. Since parity is stored in the register file, parity errors in the register file as well as the external data busses and data cache can also be detected. However, since the CPU does not check the parity of operands read out of the register file, a parity error in the register file is only detected if the erroneous register is written back to main memory or is written into the data cache and loaded back into the register file.

Instructions fetched from the external instruction cache on an instruction buffer miss also have parity since they are fetched over the local data bus. This parity is not checked when data is written into the instruction buffer, but rather when each instruction is read from the instruction buffer. Thus parity errors originating in the instruction buffer are also detected, as well as errors originating in the external data busses and instruction cache. If a parity error occurs on a instruction fetch that hits in the instruction buffer, the hit is forced to be a miss, independent of CheckParity. Then the normal instruction buffer miss sequence fetches the instruction from the external instruction cache. If the parity error originated in the instruction buffer, either through a transient error or a hard error within a RAM cell, the normal IB miss refill bypass will result in correct parity when the instruction is fetched. If a parity error occurs during the write of the requested word in an instruction buffer miss refill sequence, the error is assumed to be in the data busses or external instruction cache; if CheckParity is asserted the CPU asserts interrupt in the following cycle.

A parity error could also occur in two cases during an instruction buffer miss refill sequence on the instruction following the instruction causing a miss. If the following instruction is in the same doubleword as the missing instruction, it will be written into the instruction buffer at the same time as the missing instruction, and when it is read it will be read from the RAM cells instead of from the bypass path. A parity error in this case could originate either in the instruction buffer or in external circuits. If the following instruction is in the non-requested doubleword, when it is read it will read from the bypass path. A parity error in this case would be independent of the instruction buffer RAM array (i.e. it would probably originate externally). Since these two cases are not distinguished, the CPU just forces a miss on a parity error on the instruction following a miss. Then if the parity error occurs on the refetch of the instruction from off chip, the error will occur during the write of the requested doubleword and will cause an interrupt (assuming AllowInt is asserted). Thus a bit cell error in the instruction buffer, whether transient or due to defects, will simply cause additional instruction buffer misses but will not prevent execution of programs. Up to one cell in every byte of every instruction in the instruction buffer may fail and the chip will still work (albeit more slowly).

In general, the last two uncommitted "valid instructions" must be restarted when returning from an interrupt. If the last valid instruction is in WB, it should only be restarted in the presence of page faults since in other circumstances the instruction in WB will have already committed. Note that in order to be restarted, load instructions cannot have ra=rr since they will have already written rr.

Although there may be as few as two valid instructions in the pipeline, there may be only one restartable instruction in the pipeline after an interrupt. This occurs in the case of a Coprocessor→CPU transfer that follows immediately after a CPU→Coprocessor transfer. The Coprocessor->CPU transfer instruction will have two successive interlocks. At this point, the address of the CPU→Coprocessor instruction will be in WBpc and the address of the Coprocessor→CPU transfer instruction will be in IFpc, ALUpc, and MEMpc. If an I/O interrupt occurs in this situation, the CPU→Coprocessor instruction in WB will not be restarted, which leaves only one valid instruction to restart. If there is only one restartable valid PC in the PCQ, then there can be no pending branches, and the instructions specified by IFpc and IFpc+4 should be restarted.

Once the PC's to be restarted have been found, they must be placed back into MEMpc and WBpc, with the first instruction to be restarted placed in WBpc. PCQ may be written by specifying it as the rr field in CPU ALU or add immediately instructions. The write will take place in the MEM pipestage; the PCQ is read in the ALU pipestage. Thus writes to the PCQ will commit one cycle earlier than other instructions, and reads will occur one cycle later. (But since all interrupts must be off to execute these instructions, we are safe.)

To return from an interrupt, the values placed in the PCQ must be transferred to the PC. The transfer must be done by an add immediate instruction with PCQ or PCQE in the rb field and PC in the rr field. Reading the PCQE register reads the PCQ with the side effect of exiting kernel mode. The first transfer of addresses from the PCQ to the PC when exiting kernel mode must use the PCQE register address. The jump to the transferred address and the exit from kernel mode take place after a delay of one instruction, just as other conventional branches have a branch delay of one. Next, PCQ→PC must be executed in the branch delay slot, which restarts the instruction formerly in MEMpc but now in WBpc. The next instruction after this will be the first restarted instruction in user mode. The instruction buffer is automatically flushed on interrupts and return from kernel mode, thus the restarted instructions will always miss in the instruction buffer. If one of the values restarted from the PC queue causes a translation buffer fault, an interrupt will occur. However, if the TB fault was on the instruction access of the first restarted instruction, the PC queue will contain an undefined value in ALUpc (and hence also the same value in MEMpc and WBpc due to the instruction buffer miss). If after processing this exception, the values in ALUpc and IFpc were restarted, incorrect operation would result from the undefined address in ALUpc. Therefore for correct operation the first return PC must have a valid translation.

The Kernel signal (i.e., pin) is associated with the instruction in the IF pipestage. It is the responsibility of the coprocessors to track the Kernel bit through the remaining pipestages, just as they track Op and Reg. The ability of an instruction to perform a privileged instruction in a particular pipestage is dependent on the value of the Kernel bit associated with the instruction in that pipestage.

FLOATING POINT PROCESSOR

Figure 4:
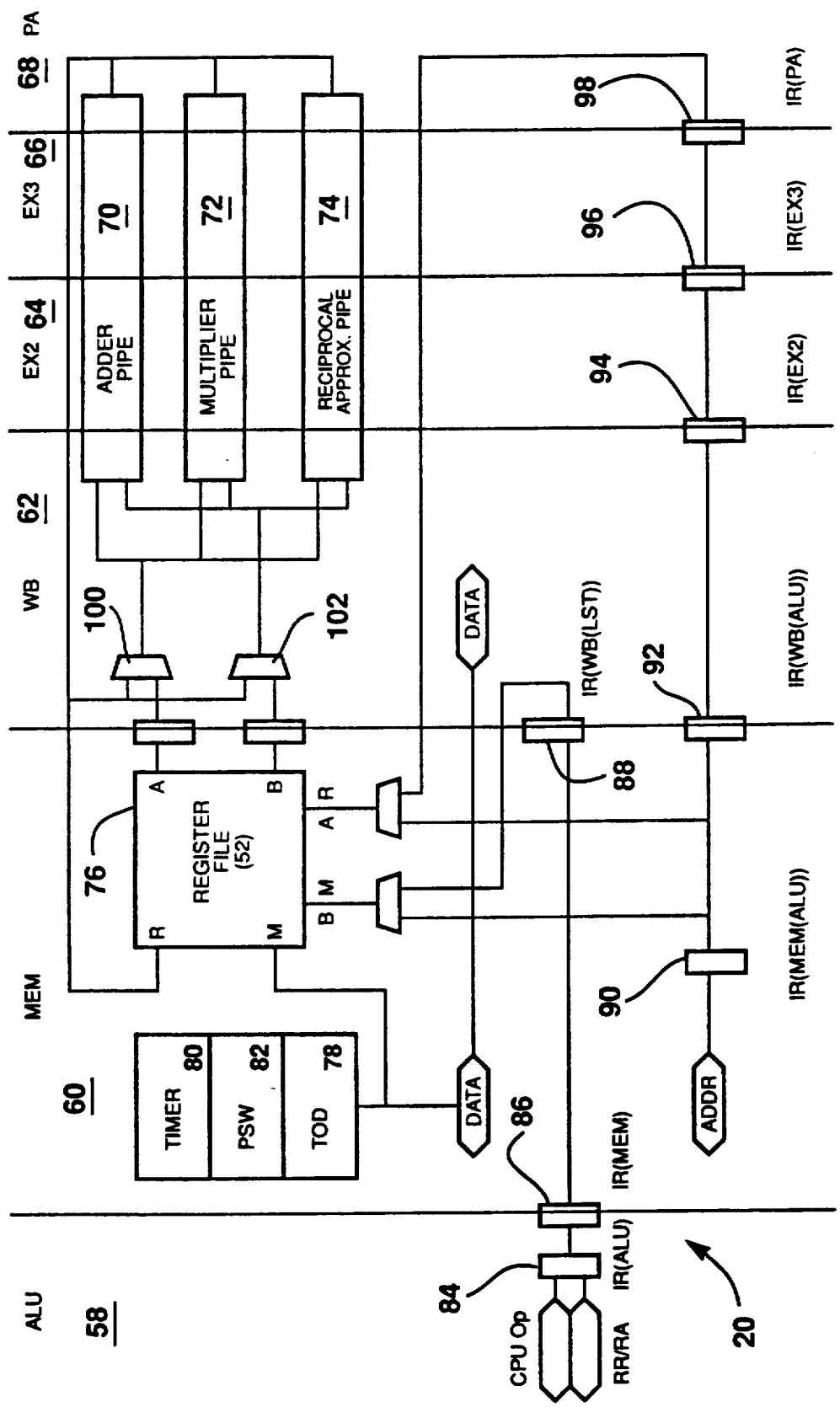
FIG. 4 is a block diagram of another portion of the processor of FIG. 2, showing a second embodiment of a system in accordance with the invention.

FIG. 4 gives an overview of the microarchitechture of the FPU 20 and its pipeline. The FPU extends the four stage pipeline to a total of seven stages 58-68. The additional pipestages are EX2 64 (execute stage two), EX3 66, and PA 68 (write back ALU result, called put away to prevent confusion with WB). Execute stage one is WB 62. The FPU 20 has four major data path blocks: adder 70, multiplier 72, reciprocal approximation unit 74 and register file 76. The register file 76 has four ports: two are read for A and B ALU source operands, the ALU results are written to the R port, and loads/stores/transfers read or write the memory (M) port. In addition, a time-of-day counter 78, an interval timer 80 and an FPU PSW 82 are above the register file 76. There are eight instruction registers (IR) 84-98. IR[ALU] 84 and IR[MEM]86 hold instructions in the ALU and MEM pipestages 58 and 60, respectively. IR[WB[LST]] 88 holds load/store/transfer instructions in the WB pipestage 62. Similarly, IR[MEM[ALU]] 90 holds ALU instructions in the MEM pipestage 60, and IR[WB[ALU]] 92 holds ALU instructions in the WB pipestage 62. IR[EX2] 94, IR[EX3] 96 and IR[PA] hold ALU instructions in the EX2, EX3 and PA pipestages 64, 66 and 68, respectively. All instruction registers except IR[MEM[ALU]] 90 and IR[WB[ALU]] 92 consists of an opcode and one register specifier; IR[MEM[ALU]] 90 and IR[WB-[ALU]] 92 contain an entire 32 bit FPU ALU instruction. Source operand and bypass multiplexers 100 and 102 are connected between the register file 76 and the adder 70, multiplier 72 and reciprocal approximation unit 74.

FPU 20 INTERNAL TIMING

In contrast to most high performance floating point engines, the FPU 20 has a lock step pipeline like the CPU 18, greatly simplifying the control logic. For example, since all functional units have a three cycle latency, the functional unit write port to the register file need not be reserved or checked for availability before instruction issue.

The FPU control is split into two parts. The first part manages the operation of FPU loads, stores, and transfers. The second part manages FPU ALU instructions. These two parts of the machine communicate through the register file, register reservation bits, and the interchip pipeline control signals. The use of the pipeline control signals will be explained in detail below, however, an overview of their use follows. LoadWB (and hence LoadMEM, LoadALU, and LoadIF) are deasserted by the FPU ALU control section and stall the control section for FPU loads, stores, and transfers (i.e, the LST section). This is used to prevent FPU loads, stores, or transfers from executing before prior FPU ALU instructions have issued. (In the case of vector FPU ALU instructions, only one element must be issued for the stall to be cleared.) There is no dual of this situation to prevent FPU ALU instructions from executing ahead of previous loads, stores, and transfers because they all use the data bus and are serialized by it. Table IX is a composite timing description for all types of FPU loads, stores, and transfers. Table X describes the timing for an FPU ALU instruction.

TABLE IX

| Stage | Phase | Operation |
|---|---|---|
| ALU | 1 | Read CPU opcode bus |
| 58 | 2 | |
| | 3 | |
| | 4 | |
| MEM | 1 | |
| | 2 | Read register if FPU→CPU |
| 60 | | Read register reservation bit |
| | 3 | Deassert LoadWB if register reserved |
| | 4 | Drive data bus if FPU→CPU |
| | | Latch data bus (for FPU load) |
| WB | 1 | |
| (EX1) | 2 | Read or write register for FPU store or load |
| 62 | | Read register reservation bit |
| | 3 | Deassert LoadWB if FPU store register reserved |
| | | Latch data bus (for CPU→FPU) |
| | | Drive data bus if Store |
| | 4 | |
| EX2 | 1 | |
| 64 | 2 | Write register if CPU→FPU |

Once an ALU instruction gets into the WB pipestage, it is guaranteed to complete. This is required for compatibility with CPU instructions, which also commit in the WB pipestage. Vector instructions that overflow on one element discard all remaining elements after the overflow. The destination register specifier of the first element to overflow is saved in the PSW. note that vector ALU instructions may continue long after an interrupt. For example in the case of vector recursion (e.g., r[a] :=r[a−1]+r[a−2]), if there was an interrupt just after the instruction entered WB the last element would not be written for 48 cycles.

TABLE X

| Stage | Phase | Operation |
|---|---|---|
| ALU | 1 | Read CPU opcode bus |
| | 2 | |
| | 3 | |
| | 4 | |

TABLE X-continued

| Stage | Phase | Operation |
|---|---|---|
| MEM | 1 | Coproc ALU instr driven from CPU |
| | 2 | |
| | 3 | Set up register file predecoders |
| | 4 | Read and latch source registers |
| | | Send op code to FU's |
| | | Read register reservation table |
| | | Compute if this was a valid FPU ALU instr |
| | | Compute if bypass required - tell FU's |
| | | If interrupt, nop instr leaving MEM |
| WB (EX1) | 1 | Drive sources to FU's |
| | | Provisionally issue the instruction |
| | | FU's latch sources or result if source bypass |
| | | FU's start computing, first FU pipestage |
| | 2 | If instr was valid and ready when issued then begin reserve destination reg; |
| | | increment appropriate register specifiers; |
| | | decrement vector length end |
| | 3 | If ((CPU is sending another ALU instr) and (vector length remaining <> −1)) |
| | | or register interlock |
| | | then deassert LoadWB |
| | 4 | |
| EX2 | 1 | Continue computing, second FU pipestage |
| | 2 | . |
| | 3 | . |
| | 4 | . |
| EX3 | 1 | Continue computing, third FU pipestage |
| | 2 | . |
| | 3 | . |
| | 4 | . |
| PA | 1 | FU drives result |
| | | Clear reservation bit |
| | 2 | Write result if IR[PA]<>nop |
| | 3 | Assert interrupt if IR[PA]<>nop and overflow |

VECTOR RESULT RESERVATION

A simple solution to the problem of reservation o vector result registers is provided by use of the existing inter-chip pipeline control signals. LoadWB (and hence LoadMEM, LoadALU, and LoadIF) is deasserted in two LST/ALU synchronization situations. Both assume a prior FPU ALU instruction (of one or more elements) is being held in the ALU instruction register, waiting for a pending write of a source operand to complete. Also, in both cases no register addresses are compared, so this approach is simple at the expense of possibly generating unnecessary stalls. First, LoadWB is deasserted when a FPU store enters WB, or an FPU→CPU instruction enters MEM, preventing it from retiring until at least the first element of the prior ALU instruction has issued. Without deasserting LoadWB in this situation FPU stores or FPU->CPU transfers of the ALU destination might execute ahead of the ALU instruction issue. But if the ALU instruction had not yet been able to issue and reserve its result register, the store could execute getting the old value even though it came after the FPU ALU instruction. However once the ALU instruction has issued, the scoreboard will be able to properly handle register dependencies between the ALU instruction and the LST instruction. Second, LoadWB is deasserted when the next FPU load or CPU→FPU transfer instruction enters MEM, preventing the load from writing its result register until at least the first element of the ALU instruction has issued and hence read both its source operands. Without deasserting LoadWB in this situation FPU loads or CPU->FPU transfers might execute ahead of the ALU instruction issue. But if the ALU instruction was waiting for a pending write of one source operand, and the other source operand was the target of the load or transfer, the load could replace its second operand with its new value before its old value was used.

If dependencies occur between elements in a vector other than the first and following loads and stores, the compiler must break the vector into smaller vectors so that the LST/ALU synchronization using LoadWB has effect. However, in most code sequences this will not be necessary; for example, if a vector operation is followed by stores of each result register, the stores can be performed in the same order as the result elements are produced. Only when operands must be stored out of order, or when the first elements of a vector are not stored but later elements are, will the compiler need to break a vector in order for the LST/ALU synchronization via LoadWB to be effective. Note that if an entire vector was required to issue before loads and stores were honored, most useful overlap of transfers and computations would be precluded.

CPU-FPU SYNCHRONIZATION

The FPU 20 must track the pipeline of the CPU 18 so that they are synchronized during transfers. It tracks the CPU 18 by observing the LoadALU, LoadMEM, LoadWB, and NotInterrupt signals (see Table XI). Pending source is an internal signal asserted if there is a valid FPU ALU instruction that can not issue because the scoreboard detects a source register is reserved for writing by a previous FPU ALU instruction. Vector in progress (VIP) is an internal signal asserted if after issuing an FPU ALU instruction and decrementing its vector length field its "vector length−1" field is not −1. Because the FPU can retire both a LST instruction and an ALU operation each cycle, two MEM and two WB instruction registers are required. The instruction register for LST instructions in the MEM pipestage is called MEM[LST]; the instruction register for FPU ALU instructions in the MEM pipestage is called MEM[ALU]. Similarly, the instruction register for LST instructions in the WB pipestage is called WB[LST]; the instruction register for FPU ALU instructions in the WB pipestage is called WB[ALU].

TABLE XI

| Pipe stage | Load MEM | NotInterrupt | Load-WB | Load-ALU | Pending source | Vector InProg. | Next stage |
|---|---|---|---|---|---|---|---|
| ALU 58 | 0 | X | X | X | X | X | ALU |
| | 1 | 0 | X | X | X | X | nop |
| | 1 | 1 | 0 | X | X | X | ALU |
| | 1 | 1 | 1 | 0 | X | X | ALU |
| | 1 | 1 | 1 | 1 | X | X | opcode bus |

TABLE XI-continued

| Pipe stage | Load MEM | NotInterrupt | Load-WB | Load-ALU | Pending source | Vector InProg. | Next stage |
|---|---|---|---|---|---|---|---|
| MEM | 0 | X | X | X | X | X | MEM |
| 60 | 1 | 0 | X | X | X | X | NOP |
|  | 1 | 1 | 0 | X | X | X | MEM |
|  | 1 | 1 | 1 | 0 | X | X | nop |
|  | 1 | 1 | 1 | 1 | X | X | ALU |
| WB(LST) | 0 | X | 0 | X | X | X | WB |
| 62 | 0 | X | 1 | X | X | X | nop |
|  | 1 | 0 | X | X | X | X | nop |
|  | 1 | 1 | 0 | X | X | X | WB |
|  | 1 | 1 | 1 | X | X | X | MEM |
| WB(ALU) | X | X | X | X | 1 | X | WB |
| 62 | X | X | X | X | 0 | 1 | next element |
|  | 0 | X | X | X | 0 | 0 | nop |
|  | 1 | 0 | X | X | 0 | 0 | nop |
|  | 1 | 1 | 0 | X | 0 | 0 | nop |
|  | 1 | 1 | 1 | X | 0 | 0 | MEM |
| EX2 | X | X | X | X | 1 | X | nop |
| 64 | X | X | X | X | 0 | X | WB |
| EX3 66 | X | X | X | X | X | X | EX2 |
| PA 68 | X | X | X | X | X | X | EX3 |

The CPU opcode and register specifier are latched into IR[ALU] on phase 1 of every cycle in which LoadALU and NotInterrupt are asserted. When latched, the opcode and register specifier correspond to the instruction in the ALU pipestage of the CPU. The instruction in IR[ALU] advances to IR[MEM] on phase 1 in cycles without LoadALU, LoadMEM, LoadWB or NotInterrupt deasserted on the previous phase 4. If NotInterrupt or LoadALU is deasserted on the previous phase 4 IR[MEM] is cleared.

If the instruction in IR[MEM] is a coprocessor ALU instruction, then the CPU will send out the ALU instruction over the address lines this cycle, and it will be latched in IR[MEM[ALU]]. The contents of the address lines are always evaluated as an FPU ALU instruction during the MEM pipestage; however they are only advanced into WB if it is a valid FPU ALU instruction. If the instruction in IR[MEM[ALU]] is an FPU ALU instruction it will advance to IR[WB[ALU]] in the absence of notLoadWB, notLoadMEM, pending source and vector in progress. Pending source and vector in progress have higher priority than notLoadMEM or interrupt; if a source operand is reserved than IR[WB[ALU]] will recirculate. Similarly if a source is not reserved, but a vector has not been fully issued, the next element of the vector will be latched into IR[WB[ALU]] independent of all external conditions. Only when neither pending source or vector in progress are asserted will notLoadMEM, interrupt or notLoadWB force IR[WB[ALU]] to nop.

If the instruction in IR[MEM] is a load, store, or transfer instruction, it will advance to IR[WB[LST]] unless LoadMEM, NotInterrupt or LoadWB are deasserted. IR[WB[LST]] is cleared if it is a LST instruction and interrupt is asserted or LoadMEM is deasserted and LoadWB is asserted.

Instructions in IR[WB[ALU]] advance to IR[EX2] unless their source operand is reserved, in which case IR[EX2] is nop. Instructions in IR[EX2] and IR[EX3] always advance to IR[EX3] and IR[PA], respectively.

It should be apparent to those skilled in the art that various changes in form and details of the invention as shown and described may be made. It is intended that such changes be included within the spirit and scope of the claims appended hereto.

What is claimed is:

1. A system for processor pipeline control of a pipeline having a plurality of sequential pipestages, which comprises a means for generating a like plurality of pipeline control signals each corresponding to an action carried out in one of said plurality of sequential pipestages, the like plurality of pipeline control signals controlling whether each of said like plurality of sequential pipestages stalls or advances, and means, connected to said means for generating pipeline control signals, for selective deassertion of each one of the like plurality of pipeline control signals in response to an exceptional event requiring one of a stall and interruption of one of the plurality of sequential pipestages corresponding to a selected one of the like plurality of pipeline control signals, and for deasserting ones of the like plurality of pipeline control signals corresponding to all those of the plurality of sequential pipestages sequentially previous to the pipestage corresponding to the selected one of the like plurality of pipeline control signals, said means for selective deassertion being configured so that a first exceptional event causing a deassertion of the pipeline control signal for a later one of the like plurality of sequential pipestages necessarily includes deassertion of any pipeline control signal appropriate for a second exceptional event causing deassertion of a previous one of the like plurality of pipeline control signals for a previous pipestage, said system being free of pipeline control logic for prioritizing the exceptional events and to translate the exceptional events into control signals.

2. The system for processor pipeline control of claim 1 in which, on the occurrence of exceptional events associated with more than one pipestage, said means for deasserting the pipeline control signals deasserts the pipeline control signals for the exceptional condition resulting in the deassertion of the most control signals.

3. The system for processor pipeline control of claim 1 in which the exceptional event is at least one interrupt, said system additionally including a means, connected to said means for deasserting the pipeline control signals, for storing addresses of every instruction in the pipeline, and means for handling the at least one interrupt connected to said means for storing addresses of every instruction in the pipeline, and means, connected to said means for storing addresses of every instruction in the pipeline for choosing at least one address for restarting execution of an instruction after interrupt handling complete.

4. The system for processor pipeline control of claim 1 in which said pipeline is in a central processing unit of a data processing system.

5. The system for processor pipeline control of claim 4 in which said plurality of pipestages include an instruction fetch pipestage, an instruction decode pipestage, an arithmetic logic unit operation pipestage, a memory fetch pipestage, and a write back pipestage.

6. The system for processor pipeline control of claim 4 in which said data processing system additionally includes a floating point coprocessor connected to said central processing unit and said floating point coprocessor includes an additional system for processor pipeline control in accordance with claim 1.

7. The system for processor pipeline control of claim 1 in which said pipeline is in a floating point processor.

8. The system for processor pipeline control of claim 7 in which said plurality of pipestages includes an arithmetic logic unit operation pipestage, a memory fetch pipestage, at least one floating point execution pipestage, and a write back pipestage.

9. A method for processor pipeline control of a pipeline having a plurality of sequential pipestages, which comprises generating a like plurality of pipeline control signals each corresponding to an action carried out in one of said plurality of sequential pipestages, the like plurality of pipeline control signals controlling whether each of said like plurality of sequential pipestages stalls or advances, selectively deasserting one of the like plurality of pipeline control signals in response to an exceptional event associated with one of the plurality of sequential pipestages corresponding to a selected one of the like plurality of pipeline control signals, and deasserting ones of the like plurality of pipeline control signals corresponding to all those of the plurality of sequential pipestages sequentially previous to the pipestage corresponding to the selected one of the like plurality of pipeline control signals, a first exceptional event causing a deassertion of the pipeline control signal for a later one of the like plurality of sequential pipestages necessarily including deassertion of any pipeline control signal appropriate for a second exceptional event causing deassertion of a previous one of the like plurality of pipeline control signals for a previous pipestage, said system being free of pipeline control logic for prioritizing the exceptional events and to translate the exceptional events into control signals.

10. The method for processor pipeline control of claim 9 in which, on the occurrence of exceptional events associated with more than one pipestage, the pipeline control signals are deasserted for the exceptional condition resulting in the deassertion of the most control signals.

11. The method for processor pipeline control of claim 9 in which the exceptional event is at least one interrupt, said method additionally including the steps of storing addresses of every instruction in the pipeline, handling the at least one interrupt and choosing at least one address for restarting execution of an instruction after interrupt handling is complete.

12. The method for processor pipeline control of claim 9 in which said pipeline is in a central processing unit of a data processing system.

13. The method for processor pipeline control of claim 12 in which said plurality of pipestages include an instruction fetch pipestage, an instruction decode pipestage, an arithmetic logic unit operation pipestage, a memory fetch pipestage, and a write back result of instruction pipestage.

14. The method for processor pipeline control of claim 12 in which said data processing system additionally includes a floating point coprocessor connected to said central processing unit and the method of claim 9 is additionally carried out in said floating point coprocessor.

15. The method for processor pipeline control of claim 9 in which said pipeline is in a floating point processor.

16. The method for processor pipeline control of claim 15 in which said plurality of pipestages includes an arithmetic logic unit operation pipestage, a memory fetch pipestage, at least one floating point execution pipestage, and a write back pipestage.

17. The system for processor pipeline control of claim 1 in which the action carried out in said plurality of sequential pipestages is loading an element in each of said plurality of pipestages.

18. The method for processor pipeline control of claim 1 in which the action carried out in said plurality of sequential pipestages is loading an element in each of said plurality of pipestages.

* * * * *